United States Patent
Lin et al.

(10) Patent No.: US 11,599,633 B1
(45) Date of Patent: Mar. 7, 2023

(54) SECURITY INFORMATION EXTRACTION AND PROBE INSERTION FOR SIDE-CHANNEL ANALYSIS

(71) Applicant: ANSYS, INC., Canonsburg, PA (US)

(72) Inventors: Lang Lin, Cupertino, CA (US); Norman Chang, Fremont, CA (US); Joao Geada, Chelmsford, MA (US); Deqi Zhu, San Jose, CA (US); Dinesh Kumar Selvakumaran, Pflugerville, TX (US); Nitin Kumar Pundir, Gainesville, FL (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 17/174,436

(22) Filed: Feb. 12, 2021

Related U.S. Application Data

(63) Continuation-in-part of application No. 16/948,158, filed on Sep. 4, 2020.
(Continued)

(51) Int. Cl.
*G06F 30/392* (2020.01)
*G06F 21/55* (2013.01)

(52) U.S. Cl.
CPC .......... *G06F 21/556* (2013.01); *G06F 30/392* (2020.01); *G06F 2221/034* (2013.01)

(58) Field of Classification Search
USPC ....................................................... 716/115
See application file for complete search history.

(56) References Cited

U.S. PATENT DOCUMENTS

| 11,301,608 B2 | 4/2022 | Lin et al. |
| 2011/0223926 A1 | 9/2011 | Shumow et al. |

(Continued)

OTHER PUBLICATIONS

B. Halak, J. Murphy and A. Yakovlev, "Power balanced circuits for leakage-power-attacks resilient design," 2015 Science and Information Conference (SAI), 2015, pp. 1178-1183, doi: 10.1109/SAI.2015.7237294. (Year: 2015).*

(Continued)

*Primary Examiner* — Bryce M Aisaka
(74) *Attorney, Agent, or Firm* — Womble Bond Dickinson (US) LLP

(57) ABSTRACT

Methods, machine readable media and systems for performing side channel analysis are described. In one embodiment, a method can determine, from a gate level representation of a circuit in a layout on a die of an IC, a first set of paths through the circuit that process security related data during operation of the circuit, the circuit including a second set of paths that do not process security related data; and the method can further determine, in a simulation of power consumption in the first set of paths but not the second set of paths, power consumption values in the first set of paths to determine potential security leakage of the security related data in the circuit. The method can further determine, from the power consumption values, positions in the layout for inserting virtual probes on the die for use in measuring security metrics that indicate potential leakage of the security related data. The insertion of the virtual probes is relative to the actual simulated layout of the die. Other methods, machine readable media and systems are also described.

20 Claims, 7 Drawing Sheets

Related U.S. Application Data

(60) Provisional application No. 63/057,475, filed on Jul. 28, 2020.

(56) References Cited

U.S. PATENT DOCUMENTS

| | | |
|---|---|---|
| 2016/0140274 A1 | 5/2016 | Wachs et al. |
| 2021/0026994 A1 | 1/2021 | Tehranipoor et al. |
| 2022/0019720 A1* | 1/2022 | Bhunia ................ H04L 9/08 |

OTHER PUBLICATIONS

Office Action from U.S. Appl. No. 17/201,939 dated Apr. 12, 2022, 6 pages.
Office Action from U.S. Appl. No. 16/948,158 dated Aug. 17, 2021, 6 pages.
Notice of Allowance from U.S. Appl. No. 17/201,939 dated Aug. 3, 2022, 7 pages.
Notice of Allowance from U.S. Appl. No. 16/948,158 dated Dec. 10, 2021, 5 pages.

* cited by examiner

SECURITY INFORMATION EXTRACTION AND PROBE INSERTION FOR SIDE-CHANNEL ANALYSIS

This application claims priority to and the benefit of U.S. provisional patent application No. 63/057,475, filed Jul. 28, 2020 and this US provisional patent application is hereby incorporated herein by reference. This application is also a continuation-in-part of U.S. application Ser. No. 16/948, 158, filed Sep. 4, 2020, which is incorporated herein by reference.

BACKGROUND

This disclosure relates to data security for devices, such as smart phones, credit cards, and computers.

Side channel attacks on a device, such as a smart phone or credit card or computer, can non-invasively extract sensitive information, such as cryptographic keys or passwords, from the device. There has been a proliferation of such attacks that exploit unintentional leakage through the "side channel" information which includes information derived from power supply noise (e.g., on a power grid of an integrated circuit (IC)), power consumption, electromagnetic emission, and thermal emission. For example, by measuring the dynamic voltage drop or current draw of a device while performing a large number of encryption/decryption operations, the sensitive information of the device can be learned and extracted through statistical correlation analysis. Current methods to detect these leakages during a process for designing a device rely upon hardware techniques that test the device after manufacturing the device, and these tests are performed in laboratories of certified testing services. These tests can be used to cause a redesign of an IC, but only after the IC has been fabricated.

Side channel attacks (SCA) can extract secret data from running ICs (that are using the secret data such as cryptographic keys) by measuring the physical emissions of security sensitive registers/nets or unprotected data memory. The protection of side channel leakage would require a thorough side channel emission analysis (SCeA) of the targeted chip at multiple locations, including the power noise presented in the entire power supply network, the electromagnetic field radiation near the chip surface, as well as the temperature profile of the chip package system.

SUMMARY OF THE DESCRIPTION

The disclosure describes methods to track and probe side channel leakage of a given set of security assets of a design. The disclosed methods can identify security sensitive registers/nets (SSRN) with security sensitive input/output ports by iteratively calling static timing analysis (STA) engine to track information flow from one execution path level to the next and detect potential list of security sensitive registers/nets (SSRN). A list of gates/nets with tight correlation to the security assets can be identified with full coverage of side channel leakage, and this analysis can be performed when the layout on an IC is known so the analysis is aware of the actual physical layout of the design of the circuit on a die an IC (integrated circuit). To avoid path explosion problem, the tracking operations may be performed only on a unique set of sink registers selected from all the apparent paths reported by the STA tool. SSRN can be reported by each timing execution depth and by each security asset (such as each subkey in a private key cryptosystem) in the design. SSRN can be further classified to be related to each subkey of security asset.

In one embodiment, the disclosed mechanism can rank the potential cell level power side channel leakage based on a cell security metric (such as normalized power annotated as "Pnormalized") defined by a combination of peak power and power variation of each security sensitive instance. For example, the security metric. Pnormalized can be obtained according to per instance time based power waveform (including leakage power, internal/switching power, and glitch power) calculated for thousands of encryption workloads. Alternatively or optionally, the list of security sensitive instances in the design can be ranked for each subkey.

A method according to one embodiment can include the following operations: receiving a gate level representation of a design of a circuit, the representation including a layout of the circuit in a physical space on a die of an integrated circuit; determining, from the gate level representation, a first set of paths through the circuit that process security related data during operation of the circuit, the circuit including a second set of paths that do not process security related data; and determining, in a simulation of power consumption in the first set of paths but not the second set of paths, power consumption values in the first set of paths to determine potential security leakage of the security related data in the circuit. In one embodiment, the method can further include the operations of: determining, from the power consumption values, positions on the layout for inserting virtual probes on the die for use in measuring security metrics that indicate potential leakage of the security related data; and inserting, in the simulation, the virtual probes on the simulation of the die in positions along the first set of paths in the layout. In one embodiment, the method can further include the operation of: ranking security risk at gates in the first set of paths in the layout but not in the second set of paths based on the power consumption values in the first set of paths.

In one embodiment, the number of inserted probes can be limited to a user specified number of probes selected from the number of possible positions for probes that were ranked. For example, the ranked list of positions can be used to select only the highest ranked positions (representing the highest security leakage) so that the simulation system is restricted to using only those highest ranked positions to insert virtual probes at only those positions. In one embodiment, all instances ranked as "security critical" can be selected to be probed by finding a shortest resistance path between instance power/ground pins and a pre-generated nearby probe on top metal layer or any metal layer specified, for example, by users. As a result, the total number of probes created on layout database as well as the runtime of layout based side channel emission analysis flow can be reduced.

In one embodiment, the method can further include the operation of: iteratively calling a static timing analysis engine to determine forward reachable logic in the first set of paths.

In one embodiment, the positions can be determined by determining a least resistive path from a selected gate at one of the determined positions for a virtual probe in the first set of paths in the layout and a node on a top metal layer in the layout.

In one embodiment, the virtual probes can collect simulated side channel emission security metrics data such as peak power and other simulated values. In one embodiment, the ranking of security risk is based on peak power and variation of power, and wherein a gate or register having a high peak power is ranked higher than a gate or register with a low peak power, and a gate or register with a high variation of power is ranked higher than a gate or register with a low variation of power.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

The present invention is illustrated by way of example and not limitation in the figures of the accompanying drawings in which like references indicate similar elements.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
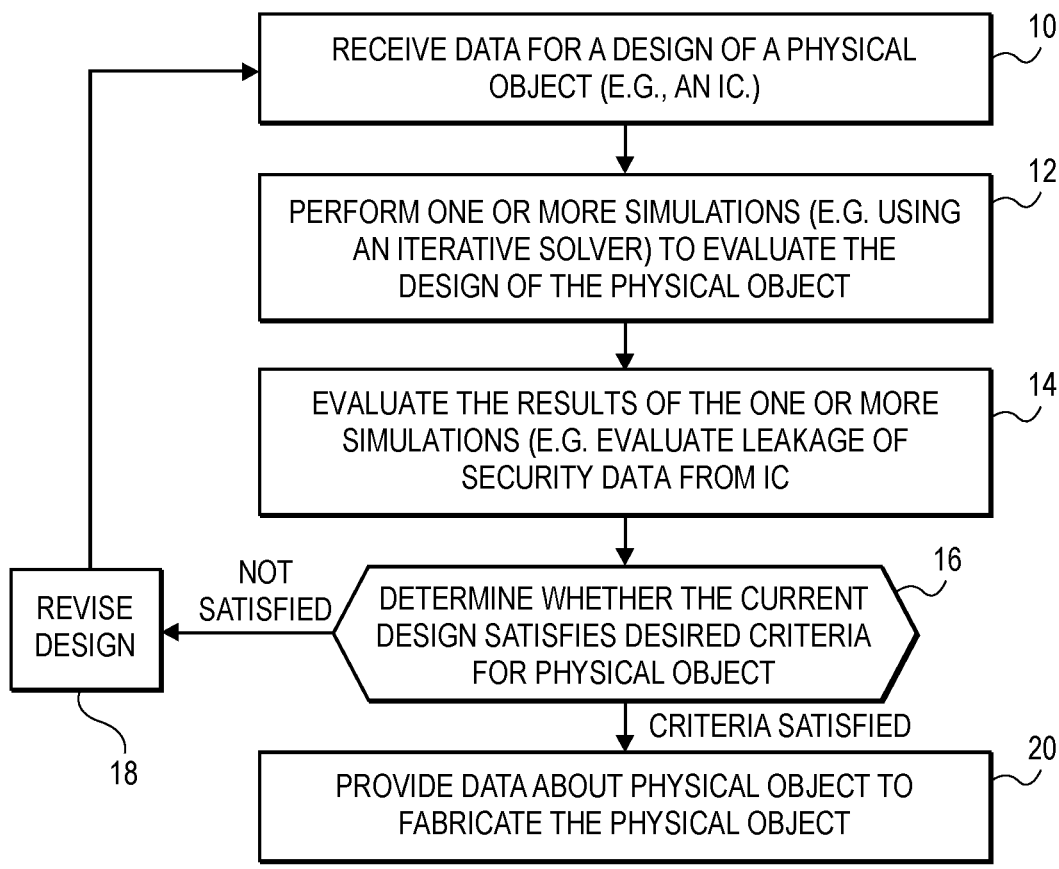
FIG. 1 shows an example of a method that can be used in one embodiment to design an electrical circuit such as an integrated circuit (IC).

The embodiments described herein can be used in simulations of electrical circuits (for example, an IC or a plurality of ICs on a circuit board or set of circuit boards) in order to determine whether a particular design of the circuit satisfies particular requirements for the circuit or system containing the circuit. For example, there might be certain design requirements for protecting sensitive data, such as passwords, cryptographic keys, and other cryptographic data and sensitive data, in a device. FIG. 1 shows a method in which these design requirements can be tested relative to a particular design of an IC or physical system which is being simulated. In operation 10 of FIG. 1, a data processing system can receive data about a design for a particular IC or other electrical circuit. The data can be created in CAD software on a data processing system, and the data can include information about the gates to be used to fabricate the IC, such as cell library information about the gates, etc. Then in operation 12, the data processing system can perform one or more simulations (such as simulations based on dynamic current models) to evaluate the design of the IC. These simulations can use the aspects and embodiments described herein. In one embodiment, the data processing system can perform simulations by using a solver such as an iterative solver which converges upon a solution that specifies parameters relative to the IC in the simulation. In operation 14, the designer can evaluate the results of one or more simulations to determine whether the design of the IC satisfies certain desired criteria for the design. For example, a designer can determine whether it is too easy to detect the one or more keys (or other sensitive data) in the device from current results. This determination is shown in operation 16. If the one or more criteria is satisfied, then the designer in operation 20 can provide data about the circuit to allow the fabrication or manufacture of the IC or system. For example, if the one or more criteria is satisfied, one or more CAD files can be produced that describe how to build the IC or system. If the criteria are not satisfied as determined in operation 16, the designer can revise the design in operation 18 (for example, by applying known countermeasures on identified leaky instances or by changing sizes and/or quantity of the power distribution network, etc.) and repeat the process by performing additional further simulations to evaluate the redesigned circuit. Thus, the embodiments described herein can be used repeatedly during the redesigning process to evaluate the adequacy of the countermeasures that can be applied during the redesigning process. This can be repeated until the desired criteria are achieved for the circuit.

The embodiments described herein improve upon standard techniques for verifying the level of protection afforded to sensitive data (such as cryptographic keys) by using techniques that improve the speed of simulations and reduce the computational complexity of the simulations, thereby improving the operation of a data processing system (e.g., a computer) performing the simulations and other operations.

An EDA (electronic design automation) solution for effective leakage detection may depend on identifying security sensitive registers/nets (or locations) from a design and simulating the side channel emission at or near those security critical locations. An EDA design engine can refer to a set of databases, at the gate level, for all security assets of the design for identifying security critical locations. For example, a secret key set in a private key cryptosystem can be identified as security critical locations as a first step of a side channel emission analysis flow via the EDA design engine. Then any logic paths connecting with the security assets are defined as "security critical registers/nets", from which the assets may leak out through side channel emission. Traditionally, information flow tracking based on fault propagation or gate labeling approaches is limited in scalability for designs with large design size or deep sequential depth. For example, tracking all information flow of a CPU with 1000 operations cycles at gate level abstraction can be an intractable problem.

Even if tracking information flow is feasible to get a list of security sensitive registers/nets, it is difficult to decide the most effective way to mitigate/fix side channel risks in physical design phase. Probing side channel leakage of every security sensitive net is computationally very impractical using a layout database. A lot of nets may turn out to be not "security critical" to leak detectable side channel information in the form of either power noise or electromagnetic (EM) radiation.

Systems and methods are disclosed to identify security sensitive registers/nets (SSRN) at the gate netlist level for an EDA design engine. For example, the disclosed mechanism can detect potential list of security sensitive registers/nets based on a static timing analysis (STA) timing engine to track information flow. Starting from the primary input of a Verilog block, all levels of flops or registers can be identified and annotated with a level ID. Security assets can be extracted or determined from the annotated elements of the design block based on the design SPEC.

By focusing on the security assets (e.g., the 128 bit key of the AES algorithm) and the desired cycle ID, a path tracking method can be performed to iteratively search for register (flop) to register (flop) paths which could potentially be impacted by the security assets. The paths of non-critical input ports can be removed to avoid excessive computation of tracking large amounts of nets. Accordingly, a set of "potential" security sensitive registers/nets can be generated for the analyzed paths of an AES. Thus, the embodiments disclosed herein can be used with gate level information that has been laid out on a simulated physical representation of a die containing the circuit. An example of this type of layout is shown in FIG. 2.

Figure 2:
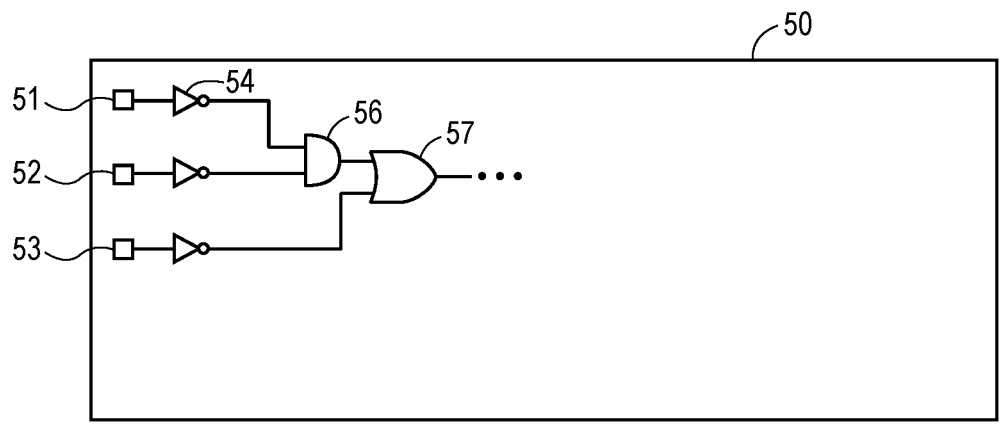
FIG. 2 shows an example of a gate level representation of a circuit at a layout level that has been laid out on a die of an IC, such that the positions of gates in the circuit are established on a representation of the physical die that can be manufactured.

Referring now to FIG. 2, a data processing system can generate a simulated representation of a die 50 with gates laid out on the die in their actual positions on the die once it is fabricated. Thus the layout at the gate level representation is aware of the location of the gates on the die, allowing a designer to selectively position virtual probes at appropriate locations on the die. In the example shown in FIG. 2, the die 50 includes many gates, most of which are not shown in FIG. 2. However, as shown in FIG. 2 the gate level representation includes numerous gates, including an inverter 54, an AND gate 56 and an OR gate 57. These gates are coupled, as shown in FIG. 2, to a set of input ports 51, 52, and 53. The design shown in FIG. 2 can be created by known software programs that perform EDA to produce a gate level representation with layout aware information on a simulated die. This type of information can be used in the various methods described herein, such as the method shown in FIG. 3A.

Figure 3A:
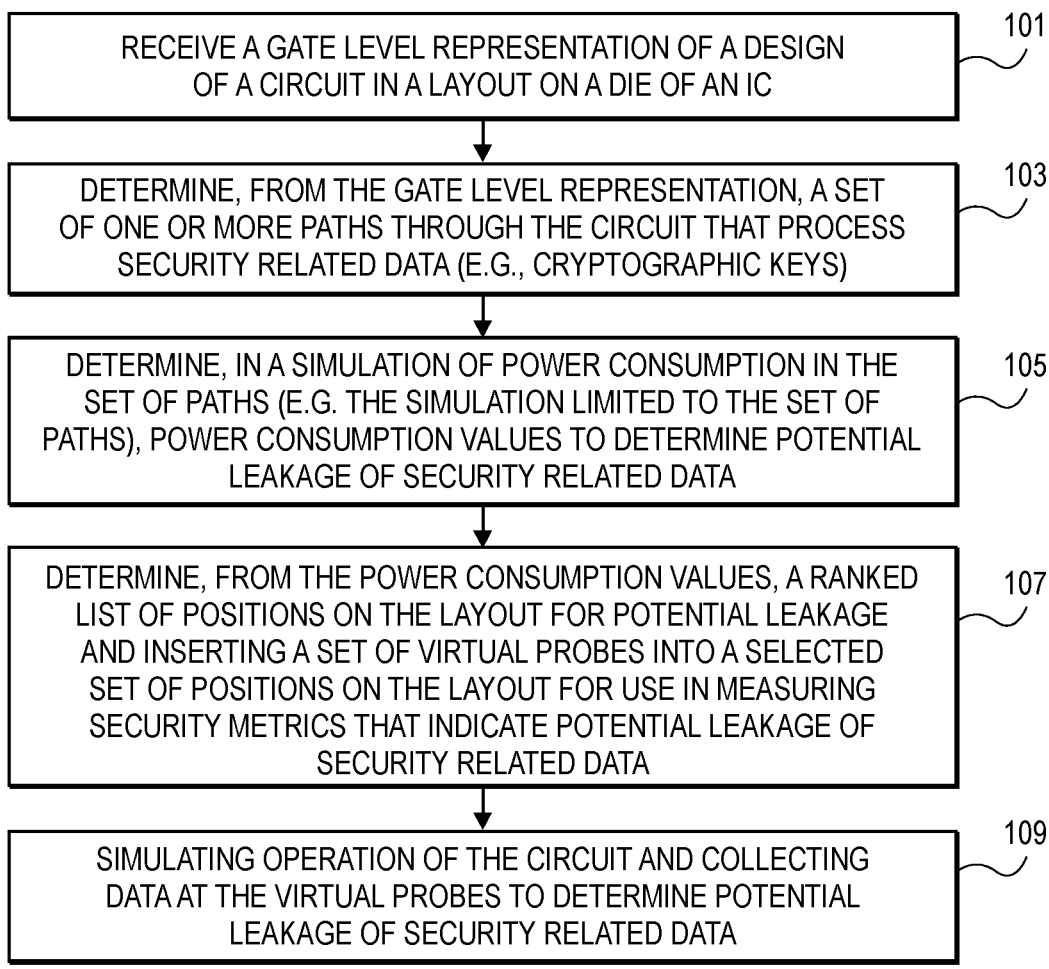
FIG. 3A is a flowchart that illustrates a method according to one embodiment.
Figure 7:
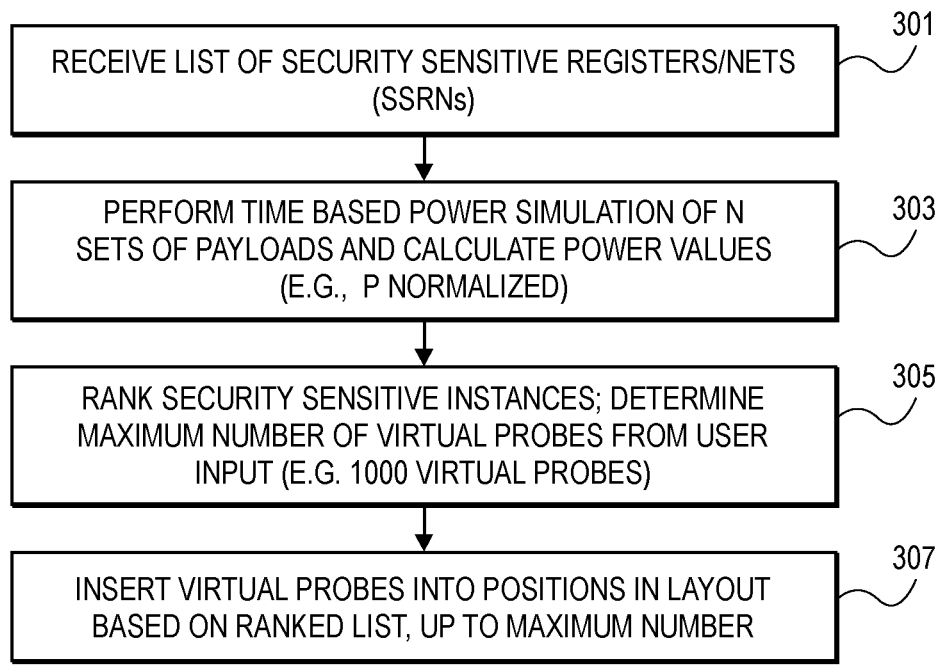
FIG. 7 shows an example of a method for ranking instances (such as gates or nets in a design at known locations on a simulated die) and inserting virtual probes at the ranked locations.

Referring now to FIG. 3A, a method according to one embodiment can begin in operation 101. In operation 101, a data processing system can receive a gate level representation of a design of a circuit in a layout on a die of an integrated circuit. The data processing system can be executing EDA software and simulation software to perform the method shown in FIG. 3A; this set of software can also perform the other methods shown and described herein. The gate level representation is laid out on the simulated die in the manner shown, for example, in FIG. 2. The layout is based on the actual size of the die so the location of each gate on the die is known. Then in operation 103, a data processing system can determine, from the gate level representation, a set of one or more paths through the circuit that process security related data, such as cryptographic keys. In one embodiment, the goal of operation 103 is to identify those paths in the circuit that process such data while also identifying other paths that do not, such that those other paths can be ignored in further processing. Further details about one embodiment of operation 103 can be found in connection with the description associated with FIGS. 4A and 5. Then in operation 105, the data processing system can determine, in a simulation of power consumption in the set of paths determined in operation 103, power consumption values to determine potential leakage of security related data. The simulation of power consumption values in operation 105 can be limited to only the set of paths that process security related data as determined in operation 103 in order to reduce computational requirements for the data processing system (and thus power consumption simulations are not performed in operation 105 for the other paths that do not process security related data). This simulation can be similar to power simulations known in the art, such as dynamic voltage drop simulations. The determined power consumption values can then be used in operation 107. In operation 107, the data processing system can determine, from the power consumption values, a ranked list of positions on the layout for potential leakage of security related data and can also insert a set of virtual probes into a selected set of positions on the layout for use in measuring security metrics that can indicate potential leakage of security related data. FIG. 7, described below, provides an example of one embodiment of operation 107. The selected set of positions for the virtual probes are based on security metrics (e.g., P normalized which is described below) that indicate an increased risk of potential leakage. Once the virtual probes have been inserted in the simulated die on the layout of the die in operation 107, operation 109 can then simulate operation of the circuit and collect data at the virtual probes to determine potential leakage of security related data. This simulation can involve simulation of power grid noise as well as electromagnetic emission at the virtual probes to determine potential leakage of security related data, and this simulation can use many more payloads and many more clock cycles than the simulations done in operation 105. Thus, a far more extensive simulation in operation 109 can be performed on a limited set of paths to provide full coverage for an analysis of security leakage.

Figure 3B:
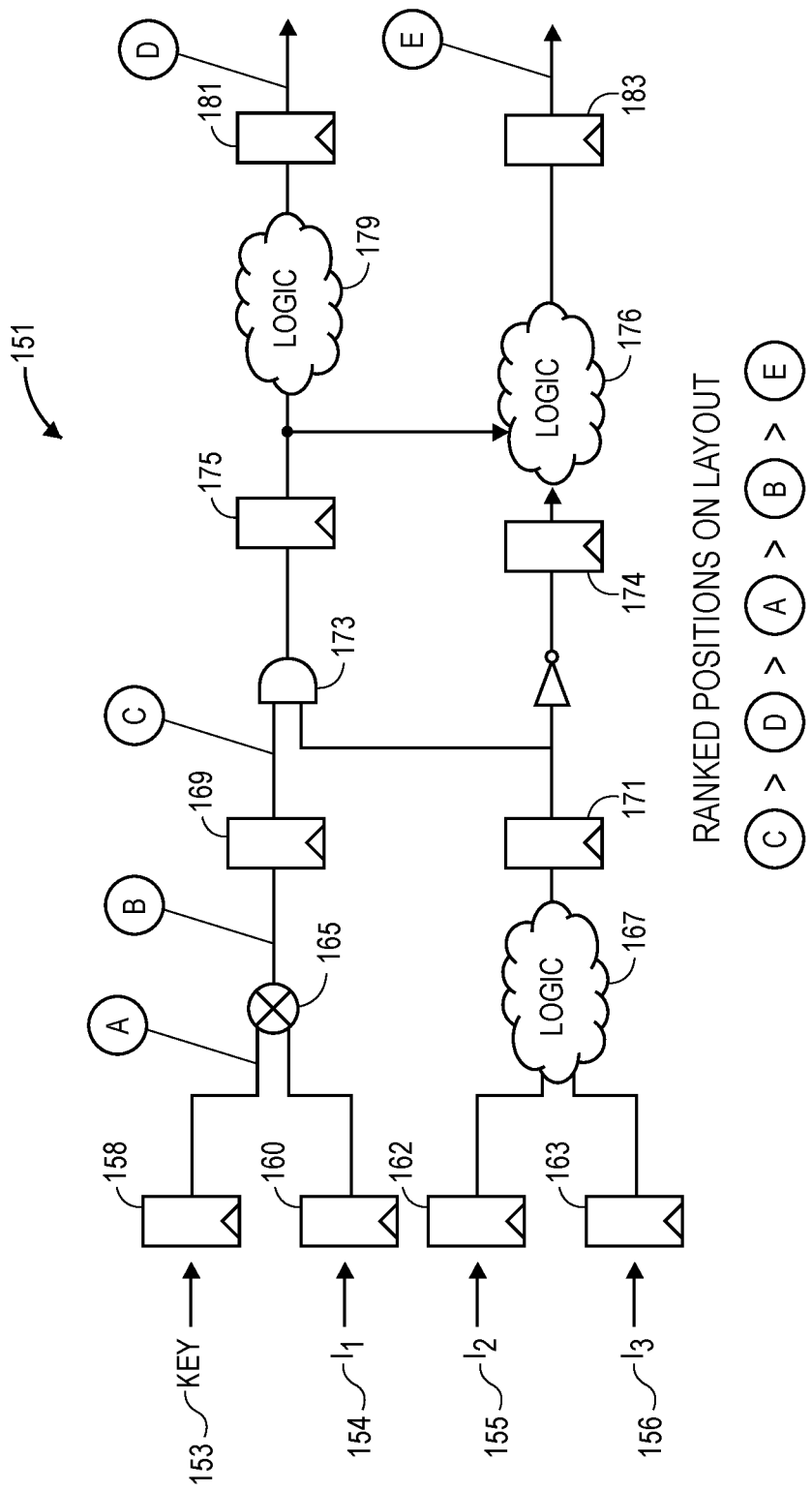
FIG. 3B shows an example of a gate level representation of a circuit at a layout level after a method according to one embodiment has determined a set of positions that are likely to leak security related data such as one or more cryptographic keys.

FIG. 3B shows an example of the result of the method shown in FIG. 3A on the layout of the circuit 151 that in part processes security related data but in other parts of the circuit 151 does not. The circuit 151 includes several inputs 153, 154, 155, and 156. Input 153 is a bit of a key, such as a subkey bit in the AES cryptographic algorithm; thus input 153 is security related data. The inputs 154, 155, and 156 are not security related data. It will be understood that the sensitive data can be in various different forms or types, including, for example, passwords, account numbers, account names, hashes, keys of various different types (file keys, device keys), device identifiers, etc. The nature of the data of these inputs is determined from a design database about the circuit, and these databases are known in the art. A designer of the circuit can obtain information about the design, such as one or more SPICE netlists, one or more security netlists, user/designer specified switching vectors for the security netlists, cell power library data, static timing analysis data such as timing windows for switching, power grid design data (such as physical data relating to size and layout of the power grid), and other physical design data.

In FIG. 3B, input 153 is applied to the clocked register 158, input 154 is applied to the clocked register 160, input 155 is applied to the clocked register 162, and input 156 is applied to the clocked register 163. These clocked registers then provide outputs, as shown in FIG. 3B, to the logic that follows the registers. In particular, registers 158 and 160 provide outputs to an exclusive OR (XOR) gate 165. Registers 162 and 163 provide outputs to logic 167. The output from the exclusive OR gate 165 is provided to the register 169 which in turn provides an output to the AND gate 173. The AND gate 173 receives an output from the register 171 which has received an input from the logic 167. The output from the AND gate 173 is provided, through register 175, to logic 176 and logic 179. Logic 179 provides an output that is coupled to the input of the register 181 which provides an output, marked as D shown in FIG. 3B. Logic 176 provides an output to the input of the register 183 which provides an output, marked as E, in FIG. 3B. Each of logic 167, logic 176 and logic 179 represent a set of gates that are not explicitly shown in FIG. 3B, but it will be understood that the set of gates can include for example AND, OR, XOR, NAND, and NOR gates but will not include any registers.

The method shown in FIG. 3A can receive the gate level representation of circuit 151 in the layout on the die and then process the gate level representation in operation 103 to determine that the circuit 151 includes two paths that process security related data. One such path includes exclusive OR gate 156, register 169, AND gate 173, register 175, logic 179, and register 181 and other gates not shown in the first path. The second path in circuit 151 that processes security related data includes logic 176 and register 183 and other gates not shown in the second path. It will be appreciated that the circuit 151 may include many other paths, not shown, and at least some of these many other paths can also process security related data while other paths not shown do not process security related data. The method shown in FIG. 3A can then perform a simulation of power consumption along these two paths to determine potential leakage of security related data. The power consumption values from these simulations can then be analyzed to derive a ranked list of positions along the security related processing paths in the layout for potential leakage. In the example shown in FIG. 3B, one simulation may identify a set of ranked positions in the layout which reveals that position C (at the output of register 169) has the highest potential of leakage of security related data while position E (at the output of register 183) has the lowest potential leakage of security related data based upon the power consumption values derived from the simulation, such as the simulation in operation 105 in FIG. 3A. Further information about ranking positions based upon power consumption values are provided below; in one embodiment, the positions along a path determined to carry or process security related data can be ranked based upon the magnitude of the power consumed at locations along the paths and also based upon the variation of power consumed at those locations. It will be appreciated that the circuit 151 may be processed by other methods described herein, including the methods shown in FIGS. 4A, 6A, 6B, and 7.

Figure 4A:
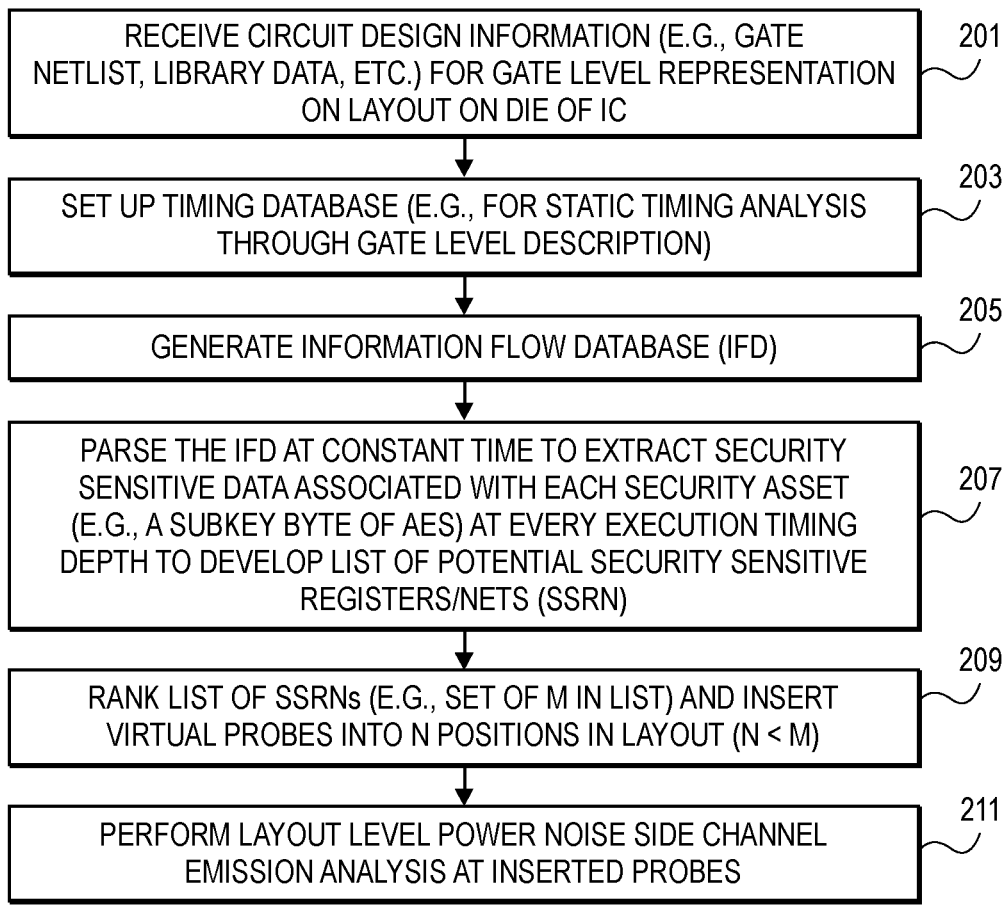
FIG. 4A is a flowchart that shows an example of a method according to one embodiment to perform side channel emission analysis.

Another example of a method according to an embodiment is shown in FIG. 4A. This method highlights the use of databases according to this embodiment. In operation 201 in FIG. 4A, a data processing system can receive a circuit design information that contains a gate level description or representation of the circuit as laid out on a die, in simulated form, of an integrated circuit. This design information can be conventional design information that can be used to fabricate the integrated circuit and provide information about the physical placement of the gates on the die. This circuit design information can include, for example, library data, gate netlist data, and other information which can often be in the form of one or more databases. In operation 203, a timing database can be set up using, for example, static timing analysis tools which analyze the gate level description. In operation 205 the data processing system can generate an information flow database (IFD) that indicates the flow of data along paths in the circuit, and this database can be used in operation 207 to extract security sensitive data associated with each security asset that is processed by the circuit at every execution timing depth to develop a list of potential security sensitive registers and nets (SSRN). In one embodiment, operations 205 and 207 can utilize a parallel processing architecture, described further below in conjunction with FIG. 5, to accelerate the processing and to deal with the explosion of paths when tracing security related data through paths the circuit. In one embodiment, the information flow database is parsed to generate the list of potential security sensitive registers and nets, and this list is then ranked in operation 209. In one embodiment, the ranking may be based upon different types of power consumption values, such as peak power consumed or average power consumed or variation of power consumed. These power consumption values can be obtained through conventional power simulation techniques, such as dynamic voltage drop simulations, etc. In one embodiment, the data processing system may receive an input from a user which specifies a limit to the number of possible virtual probes to be inserted into the design, where the limit restricts the number. For example, if the ranked list has M positions and the user has specified a limit of N positions (where N is less than M), then only N virtual probes will be inserted to occupy the N positions in the layout. After the insertion of the virtual probes, operation 211 can then perform a layout level power noise and side channel emission analysis at the inserted virtual probes. This analysis can reveal the potential security leakage risk at each of the locations with an inserted virtual probe. Each such location can be evaluated using both power grid noise and also EM emission using techniques known in the art (see for example, U.S. patent application Ser. No. 16/948,158, filed Sep. 4, 2020, which application is incorporated herein by reference).

Figure 5:
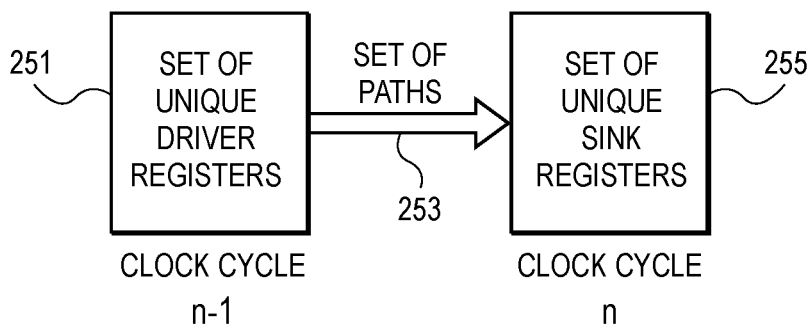
FIG. 5 shows an example of an embodiment that can divide an analysis of security leakage into separate portions of a design and then perform parallel processing of those portions to accelerate the analysis.

One embodiment of this disclosure can use a parallel computational approach to extracting the security related paths from the circuit, and this is illustrated in FIG. 5. As the data processing system performs one of the methods in this disclosure (e.g., operation 103 in the method in FIG. 3A or operation 205 in FIG. 4A), the number of possible paths from inputs to outputs can explode making the problem intractable. One approach to reduce this burdensome explosion is to isolate paths between successive registers so that each isolated path is analyzed separately in a separate processing core. For example, as shown in FIG. 5, a set of paths can be isolated to the set of paths 253 between a set of registers 251 and a set of registers 255. The circuit containing set of paths 253, registers 251 and registers 255 also contains other sets of paths and other sets of registers not shown. These other sets of paths are also isolated and analyzed separately in other processing cores. Thus the extraction of paths that process the security related data can use this parallel computational approach to efficiently extract the paths by distributing the processing of distinct, isolated paths between successive registers along the path among a set of processing cores.

FIG. 7 presents a method that highlights how power metrics (also referred to as power values), from the simulation of power consumption along the limited set of extracted paths, can be used in one embodiment. The method shown in FIG. 7 can be an example of operations 105 and 107 shown in FIG. 3A and can also be an example of operation 209 in FIG. 4A; the method shown in FIG. 7 can also be used after operation 379 in the method shown in FIGS. 6A and 6B. In operation 301 in FIG. 7, a data processing system can receive a list of SSRNs from prior operations (e.g., operation 103 in FIG. 3A or operation 207 in FIG. 4A). This list can be limited to only the set of paths that process security related data (and thus exclude paths that do not process security related data). Then in operation 303, the data processing system can perform a time based power simulation of N sets of data payloads (e.g., N sets of encryption payloads) through only the set of paths that process security related data, and this power simulation can produce, at each register in the limited set of paths (and optionally other points in the limited set of paths such as driving instances of each such register), a calculated set of power values, such as peak power and power variation. In one embodiment, a register or other point in the path that has high peak power or has high power variation will be ranked as a higher security leakage risk than a register that has a low peak power or low power variation. This means, in a typical case, that lower activity instances (such as a register in a security related data path or a driver driving that path) would be ranked lower, so it is less important to insert a virtual probe at these lower activity instance. Instances with low power variation (e.g., the power is nearly constant or varies very little) also are not likely to leak security related data and therefore such low power variation instances would be ranked lower than high power variation instances.

In one embodiment, a value (e.g., P normalized) can be calculated in operation 303 for each instance and used as the metric for ranking the instance relative to all other instances in the limited set of paths in the list (such as an SSRN list). In this embodiment, a formula to calculate this value can be: P normalized=p1*P peak_normalized+(1−p1)*P var_normalized. In this formula, * is the multiplication operation and p1 can be specified by the user/designer. The value for p1 is a weight that controls whether peak power or power variation dominates the calculated metric. If power variation is considered more important (and thus will dominate over peak power), then p1 is set to be closer to zero then 1; if peak power is considered more important (and thus will dominate over power variation) then p1 is said to be closer to 1 then zero. If p1 is set to be equal to zero then P var_normalized completely dominates this metric. P peak_normalized for each instance is calculated using the formula: P peak_normalized=(P peak−P peak_min)/(P peak_max−P peak_min), where P peak is the peak power for the instance being calculated and P peak_min is the minimum P peak over all of the instances and P Peak_max is the maximum P peak over all of the instances. P var_normalized for each instance is calculated using the formula: P var_normalized=(P var−P var_min)/(P var_max−P var_min). In this formula, P var is the power variation for the instance being calculated, and P var_min is the minimum P var for all of the instances and P var_max is the maximum P var for all of the instances. Each instance in the SSRNs can be ranked relative to all of the other instances in the SSRNs using its P peak and P var calculated values in operation 305. If the user (or the data processing system) has set a maximum number of virtual probes (as determined in operation 305), then that maximum number is used to reduce the ranked list to the maximum number. For example, if the maximum number is set at 1000 virtual probes and the SSRN list contains 1500 ranked instances, then the 1000 highest ranked instances (e.g., those instances that have the highest P normalized values) are selected, thereby leaving the 500 lowest ranked instances (e.g., those instances that have the 500 lowest P normalized values) which will not have virtual probes inserted at their locations. In operation 307, the data processing system can insert the maximum number of virtual probes at the positions of the highest ranked instances. An example of this insertion at positions or locations on the die of the ranked instances is shown in FIG. 3B.

In one embodiment, the insertion of virtual probes in operation 307 can use a method that "snaps" the position of the virtual probe at an instance to a position on a top metal layer that has the least resistive path between the position of the instance (such as one of the power and ground nodes (Vdd or Vss) of the instance) under the top metal layer and the top metal layer. In this method, the data processing system can calculate the resistances between the position of the instance and various possible positions on conductors on the top metal layer (or other layer selected by the user or system) and select the position on a conductor on the top metal layer (or other layer) that provides the lowest resistance (e.g., a minimum effective point to point resistance between a Vdd node of the instance and a Vdd node in the top metal layer). In one embodiment, the various possible positions on conductors on the top metal layer can be pregenerated or known available positions that are used when calculating the minimum effective point to point resistance. Often, the selection of the minimum effective point to point resistance results in the selection of the closest probe point on the top metal layer.

Figure 6A:
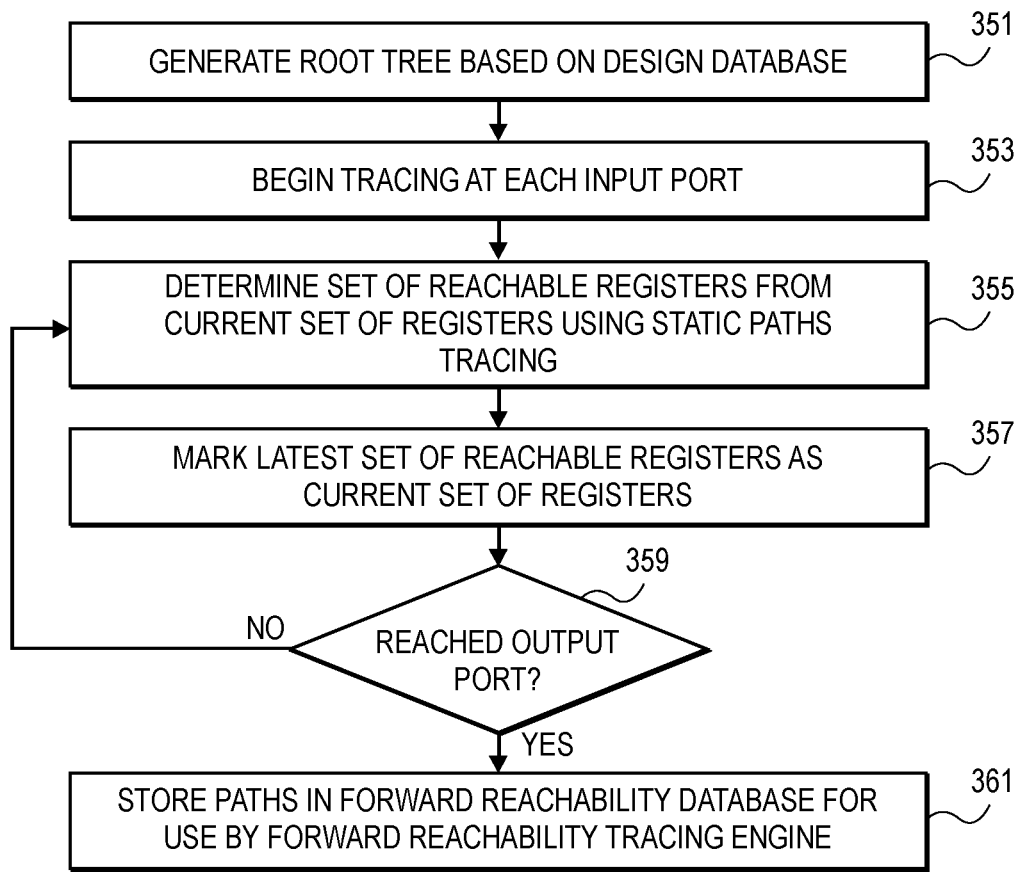
FIG. 6A shows an example of a method according to one embodiment for tracing through a design to determine paths that are likely to leak security related data.
Figure 6B:
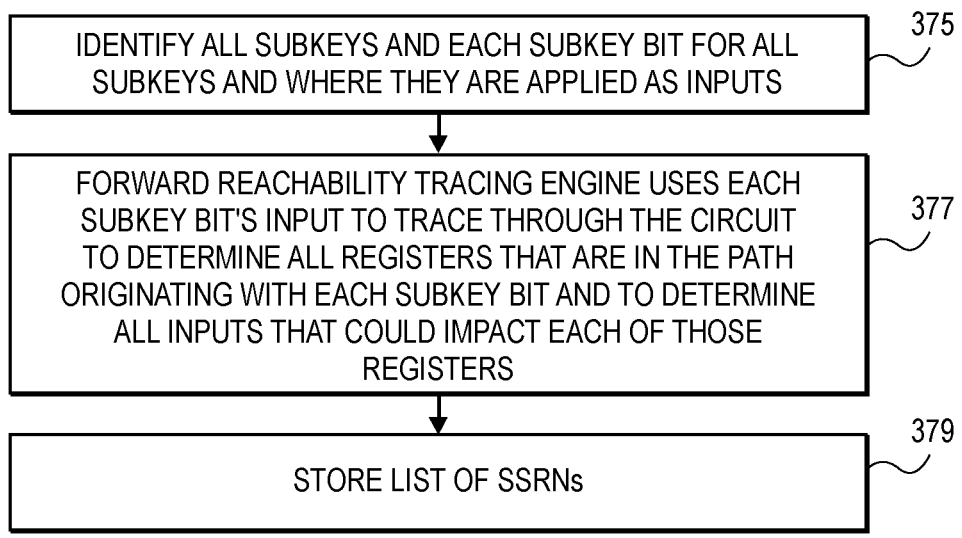
FIG. 6B an example of a method for determining paths that are likely to leak security related data.

A more specific example of an embodiment will now be described while referring to FIGS. 6A and 6B. This particular embodiment uses a forward reachability tracing engine and a forward reachability database to identify all security-related data, such as cryptographic keys. The forward reachability tracing engine traces through the circuit to determine all paths in the circuit that process security-related data. In operation 351 in FIG. 6A, a data processing system can generate a root tree based on the design database that describes the circuit. In operation 353, the data processing system can begin tracing at each input port in the root tree; an example of an input port is the input 51 shown in FIG. 2. In operation 355, the data processing system then determines a set of reachable registers from the current set of registers using a static paths tracing mechanism that is known in the art. The initial current set of registers after operation 353 would be registers coupled to an input port. After determining the initial set of reachable registers, the system then marks (in operation 357) the latest set of reachable registers determined in operation 355 as the current set of registers. In operation 359, the system then determines whether or not the processing or tracing has reached an output port. If the processing has not reached an output port, then processing returns back to operation 355 and continues to cycle through operations 355, 357 and 359 until it reaches an output port. Once it reaches an output port, the system can store paths in the forward reachability database for use by the forward reachability tracing engine. As shown in the method in FIG. 6B, the method can identify all subkeys and each subkey bit for all subkeys and where they are applied as inputs. In turn, in operation 377, the forward reachability tracing engine then uses each subkey bit's input to trace through the circuit to all registers that are in the path originating with each subkey bit. This allows the data processing system to determine those paths which process security-related data, and registers and nets in those paths can then be stored in operation 379 to provide a list of SSRNs that can be used in the other methods described herein.

Figure 8:
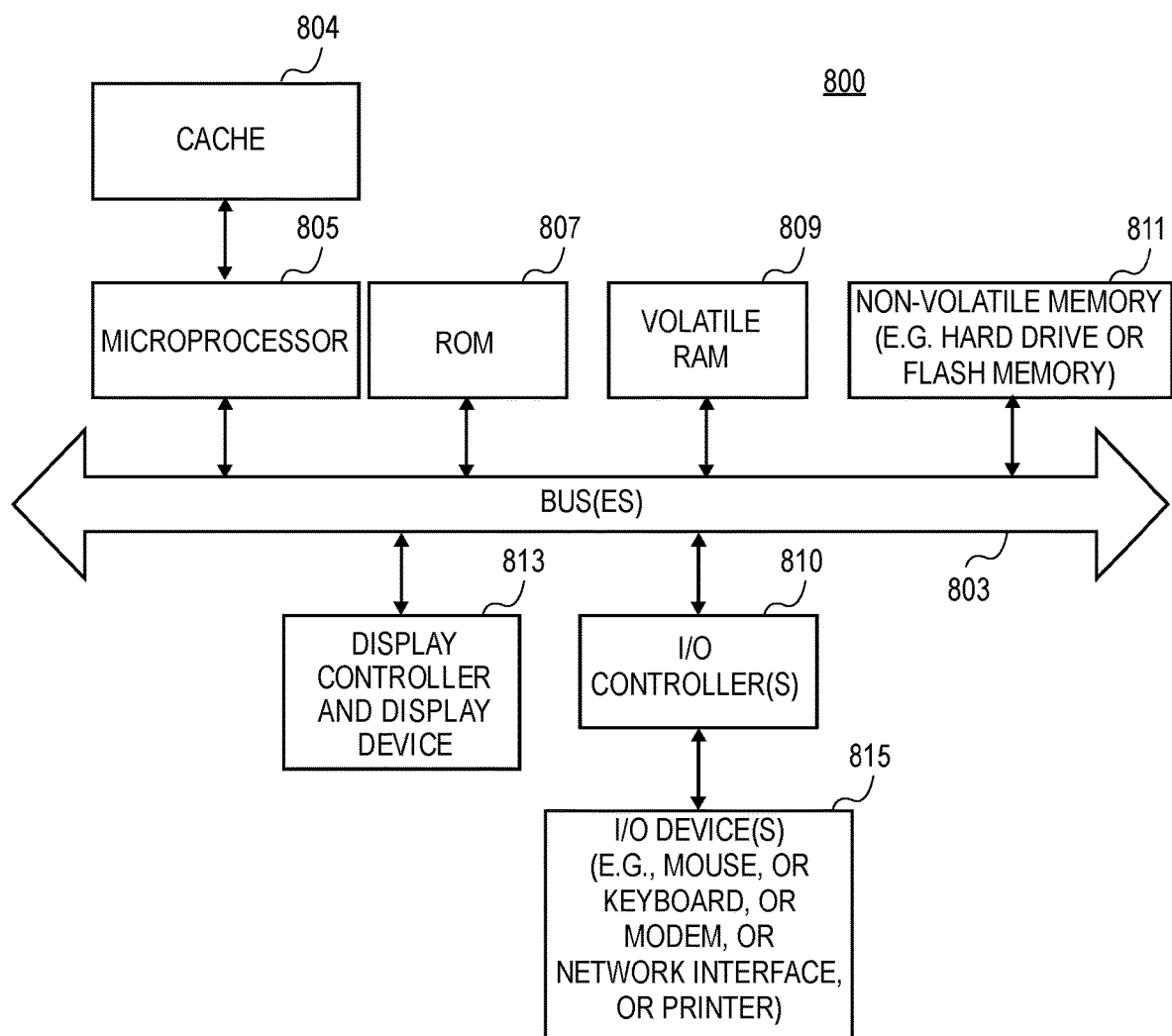
FIG. 8 shows an example of a data processing system that can be used to implement one or more embodiments described herein.

FIG. 8 shows one example of a data processing system 800, which may be used with one or more embodiments described herein. For example, the system 800 may be used to perform any one of the methods described herein such as the methods shown in FIGS. 3A, 4A, 6A, 6B and 7. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:
   receiving a gate level representation of a design of a circuit, the representation including a layout of the circuit in a physical space on a die of an integrated circuit;
   determining, from the gate level representation, a first set of paths through the circuit, the first set of paths to process security related data during operation of the circuit, the circuit including a second set of paths that do not process security related data, wherein the first set of paths includes a first set of registers and nets, and the second set of paths includes a second set of registers and nets;
   determining, in a simulation of power consumption in the first set of paths but not the second set of paths, power consumption values in the first set of paths to determine potential security leakage of the security related data in the circuit.

2. The non-transitory machine readable medium as in claim 1, wherein the method further comprises:
   determining, from the power consumption values, positions on the layout for inserting virtual probes on the die for use in measuring security metrics that indicate potential leakage of the security related data.

3. The non-transitory machine readable medium as in claim 2, wherein the method further comprises:
   inserting, in the simulation, the virtual probes on the simulation of the die in positions along the first set of paths in the layout.

4. The non-transitory machine readable medium as in claim 3, wherein the method further comprises:
   ranking security risk at gates in the first set of paths but not in the second set of paths based on the power consumption values in the first set of paths.

5. The non-transitory machine readable medium as in claim 4, wherein the inserting inserts a limited number of the virtual probes according to the security risks that were ranked.

6. The non-transitory machine readable medium as in claim 5, wherein only the N highest ranked positions have virtual probes inserted, and wherein N is set by a user input of the limited number of virtual probes.

7. The non-transitory machine readable medium as in claim 6, wherein the method further comprises:
   iteratively calling a static timing analysis engine to determine forward reachable logic in the first set of paths.

8. The non-transitory machine readable medium as in claim 2, wherein determining the positions comprises determining a least resistive path from a selected gate at one of the determined positions for a virtual probe in the first set of paths and a node on a top metal layer.

9. The non-transitory machine readable medium as in claim 1, wherein the virtual probes are to collect simulated side channel emission security metrics data.

10. The non-transitory machine readable medium as in claim 1, wherein the ranking of security risk is based on peak power and variation of power, and wherein a gate having a high peak power is ranked higher than a gate with a low peak power, and a gate with a high variation of power is ranked higher than a gate with a low variation of power.

11. A machine implemented method comprising:
    receiving a gate level representation of a design of a circuit, the representation including a layout of the circuit in a physical space on a die of an integrated circuit;
    determining, from the gate level representation, a first set of paths through the circuit, the first set of paths to process security related data during operation of the circuit, the circuit including a second set of paths that do not process security related data, wherein the first set of paths includes a first set of registers and nets, and the second set of paths includes a second set of registers and nets;
    determining, in a simulation of power consumption in the first set of paths but not the second set of paths, power consumption values in the first set of paths to determine potential security leakage of the security related data in the circuit.

12. The method as in claim 11, wherein the method further comprises:
determining, from the power consumption values, positions on the layout for inserting virtual probes on the die for use in measuring security metrics that indicate potential leakage of the security related data.

13. The method as in claim 12, wherein the method further comprises:
inserting, in the simulation, the virtual probes on the simulation of the die in positions along the first set of paths in the layout.

14. The method as in claim 13, wherein the method further comprises:
ranking security risk at gates in the first set of paths but not in the second set of paths based on the power consumption values in the first set of paths.

15. The method as in claim 14, wherein the inserting inserts a limited number of the virtual probes according to the security risks that were ranked.

16. The method as in claim 15, wherein only the N highest ranked positions have virtual probes inserted, and wherein N is set by a user input of the limited number of virtual probes.

17. The method as in claim 16, wherein the method further comprises:
iteratively calling a static timing analysis engine to determine forward reachable logic in the first set of paths.

18. The method as in claim 12, wherein determining the positions comprises determining a least resistive path from a selected gate at one of the determined positions for a virtual probe in the first set of paths and a node on a top metal layer.

19. The method as in claim 11, wherein the virtual probes are to collect simulated side channel emission security metrics data.

20. The method as in claim 11, wherein the ranking of security risk is based on peak power and variation of power, and wherein a gate having a high peak power is ranked higher than a gate with a low peak power, and a gate with a high variation of power is ranked higher than a gate with a low variation of power.

* * * * *